May 25, 1965    P. E. GAMBLE ET AL    3,184,791
APPARATUS FOR FABRICATION OF THERMOPLASTIC RESINS
Filed Aug. 17, 1962
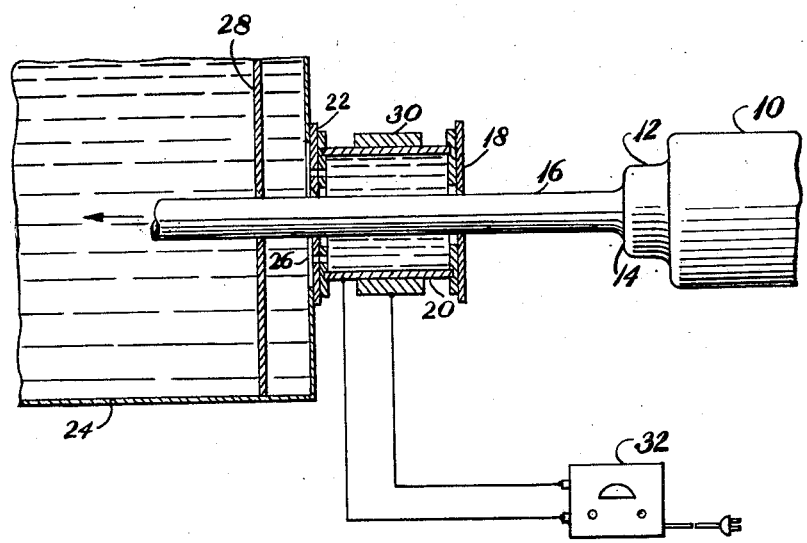
INVENTORS
PAUL E. GAMBLE
LOUIS A. ROSENTHAL
JAMES W. PENDLETON
BY *Walter C. Kehm*
ATTORNEY 3,184,791
**APPARATUS FOR FABRICATION OF
THERMOPLASTIC RESINS**
Paul E. Gamble, Bound Brook, and Louis A. Rosenthal, Highland Park, N.J., and James W. Pendleton, South Charleston, W. Va., assignors to Union Carbide Corporation, a corporation of New York
Filed Aug. 17, 1962, Ser. No. 217,602
3 Claims. (Cl. 18—14)

This invention relates to an apparatus for the fabrication of spherulite-forming thermoplastic resins, and more particularly to the improvement in the properties of the product so fabricated.

In the fabrication of thermoplastics, the resin is generally first heated to above its softening temperature. The viscous melt is then forced through a shaping orifice and subsequently allowed to cool while at the same time being maintained in a contoured form by tension or pressure.

In many respects, the cooling operation is a very critical part of the process. Most methods for the fabrication of thermoplastics involve cooling very slowly in order to prevent the outer surface from "setting up" or solidifying more quickly than the inner surface. Various changes occur, however, in the structural parameters of the resin system during cooling which affect such properties as density, burst strength, and long term strength. These changes are due, in part, to the crystalline nature of most thermoplastic resins. Upon cooling, the crystallites group themselves into ordered structures called spherulites. The size and degree of perfection of structure obtained in a spherulite is greatly affected by the rate of cooling. In a slow-cooled or annealed sample, the spherulites are large enough to be detected by the naked eye whereas in shock-cooled or quenched samples, they are so small and imperfect that elaborate microscopic techniques are required for detection.

The size and degree of perfection have a great effect on the resultant physical properties of the resin, especially the long-time stress bearing properties. For example, pipe sections with large, well-developed spherulites will rupture when a stress considerably less than the tensile strength is applied for a long period of time; polyethylene pipe under continuous sub-critical hydrostatic load suddenly ruptures during service. This rupturing effect is accelerated by certain environments especially the presence of detergents. In this latter case the phenomenon is called stress cracking. Stress cracking is extremely deleterious in cable jackets and insulation.

Improved stress rupture characteristics would greatly expand the uses of thermoplastic pipe. For instance, polyethylene pipe is not now recommended for hot water service because of its stress rupturing tendency which increases at higher temperatures. In a similar way, uses of polyethylene in wire and cable would be expanded and service lives of cable jackets would be lengthened if a means of reducing stress cracking tendencies was found.

The objectionable properties are due, in part, to the size of the spherulites in the resin. Improved stress rupture and stress cracking would be obtainable if the size of the spherulites in the fabricated pipe could be reduced.

Accordingly, it is an object of the present invention to provide apparatus for forming thermoplastic conduits such as pipe, tubing or wire and cable covering which are substantially free from the undesirable effects on the properties of objects so formed.

It is another object of the present invention to provide apparatus wherein the size and degree of structural perfection of the spherulites formed during fabrication of pipe, tubing or wire and cable covering are reduced.

These and other objects are accomplished in accordance with the present invention wherein apparatus is provided for subjecting an annular portion of extruded thermoplastic conduit while it is in its formative plastic state to ultrasonic vibrations supplied by a suitably activated transducer surrounding an annular volume of energy transmitting medium surrounding said annular portion of the thermoplastic being extruded.

A better understanding of the invention can be secured by reference to the single figure which is a sectional view, partly schematic, taken axially through the apparatus of the present invention as it relates to the extrusion of thermoplastic pipe.

The apparatus comprises an extruder 10 attached to a die 12 having an annular orifice 14 adapted to form pipe 16. The size and shape of the thermoplastic material issuing from the die 12 is fixed by passing through a first sizing plate 18 mounted on the front of spool 20. From the spool 20, the pipe passes through a second sizing plate 22 mounted between the rear of the spool 20 and the front wall of a cooling bath 24. Water from cooling bath 24 passes through apertures 26 to fill the barrel of the spool 20. A final sizing plate 28 sets the final dimension of the pipe 16 and supports said pipe as it passes through the cooling bath 24.

A transducer 30 is attached to the periphery of the spool 20, and connected by one lead to an ultra-sonic generator 32. Another lead connects the generator 32 to the periphery of the spool 20.

The hollow chamber defined by the spool 20 and the first and second sizing plate 18 and 22 provides a vibration chamber, in this embodiment an anular vibration chamber, activated by means of the transducer 30 affixed to the periphery of the spool 20 capable of subjecting the extruded pipe 16, through the surrounding cooling medium, to ultrasonic vibrations. Within the barrel of the spool 20, the pipe 16 is subjected to radial ultrasonic vibration transmitted from the transducer 30 to the outside of the pipe 16 through a toroidal volume of water or other suitable energy transmitting medium inside the spool 20 and maintaining peripheral contact with the pipe 16.

The long term strength and resistance of the resin to bursting under hydrostatic pressure and to thermal embrittlement is increased by subjecting an annular portion of the formed resin conduit during at least a portion of the cooling step and while it is in the formative plastic state to ultrasonic vibration to reduce the size of the spherulites formed in the cooled conduit. Preferably, the ultrasonic vibration is supplied by a suitably activated cylindrical transducer surrounding an annular portion of the thermoplastic conduit being cooled.

By the term 'thermoplastic conduit" as employed herein and in the appended claims is meant a thermoplastic extrudate such as thermoplastic pipe, tubing, wire and cable covering, and the like.

The procedure is most useful for synthetic organic spherulite-forming thermoplastic polymers in which spherulites grow large and adversely affect the properties of the conduit produced. Polyethylene, vinyl polymers or copolymers, vinylidene chloride/vinyl chloride copolymers, isotactic polystyrene, poly(alkylene oxides), poly-(ethylene terephthalate) and the like are examples of thermoplastic polymers in this category. Practice of this invention, however, does not depend upon the chemical make-up of the polymer.

By the term "formative plastic state" as employed in the present specification and claims is meant that state of the thermoplastic material which exists within a critical temperature range, which varies from one thermoplastic to another in both breadth and temperature values, and is delimited at the lower end by the temperature to-failure of all types of plastic pipe under constant internal hydraulic pressure.

TABLE I
*Ultrasonic vibration of polyethylene pipe*

| Material | Current | | Test results (hours to fail) | | | |
|---|---|---|---|---|---|---|
| | | | 900 p.s.i. | 800 p.s.i. | | |
| Low density polyethylene (melt index 3.0) | No current<br>20 kcs. 50 Mamps | Test temp. @ 40° C | 0.01<br>3 | 0.2<br>6 | | |
| | | Hoop stress | 1,300 p.s.i. | 1,200 p.s.i. | 1,100 p.s.i. | |
| Medium density polyethylene (melt index 0.2) | No current<br>20 kcs. 50 Mamps<br>20 kcs. 80 Mamps | Test temp. @ 40° C | 0.4<br>------<br>23 | 3<br>350<br>260 | 40<br>550<br>504 | |
| | | Hoop stress | 1,300 p.s.i. | | | |
| High density polyethylene (melt index 0.02) | No current<br>20 kcs. 40 Mamps | Test temp. @ 40° C | 312<br>1,128 | | | |
| | | Hoop stress | 1,700 p.s.i. | 1,650 p.s.i. | 1,600 p.s.i. | 1,550 p.s.i. |
| Butene modified high density polyethylene (melt index 0.05). | No current<br>40 kcs. 80 Mamps<br>40 kcs. 100 Mamps | Test temp. @ 40° C | 130<br>168<br>216 | 45<br>240<br>3,089 | 47<br>384<br>10,000 | 2,856<br>7,680<br>10,000 | at which the thermoplastic is sufficiently set or hardened so that no expansion or stretching thereof occurs, and at the upper end by the temperature at which the thermoplastic is so fluid that the polymer molecules relax after removal of the stretching force. The resin is converted from said formative state to the set or hardened state (i.e., converted to that state which resists and is not further expanded by internally applied air pressure), by directing and applying a controlled volume of coolant around the conduit.

The transducer can be either of the piezoelectric or magnetostrictive type providing it is capable of supplying a frequency above about 20,000 cycles per second (20 kcs.) which is usually accepted as the dividing frequency between sonic and ultrasonic sound. A preferred frequency range would be from about 20 to 90 kcs.

The most efficient transmittal of the ultrasonic energy is achieved when the ultrasonic waves impinge uniformly upon all surfaces of the extrudate being cooled. This, in part, dictates the particular shape of the transducer to be used. In this case, a circular transducer which focuses the ultrasonic waves at the interface between the cooling resin conduit and the cooling medium is most effective and is preferred.

Transducers are usually of the piezoelectric or magnetostrictive types. In the present invention, piezoelectric transducers are preferred.

Piezoelectric transducers are natural or synthetic crystals which have the inherent ability to undergo mechanical deformation, or changes in dimension, when an electrical potential is placed across the crystal. Materials such as barium titanate, lithium titanate, and ammonium dihydrogen phosphate, though not exhibiting a true piezoelectric effect, do possess electrostrictive characteristics and have been used successfully. The latter material is however temperature sensitive and water soluble so that adequate precautions and handling must be maintained as will be obvious to those skilled in the art.

Magnetostrictive transducers are similar devices which make use of the ability of certain metals and magnetic ferrites to undergo minute expansions and contractions when subjected to an oscillating field.

Pipe extruded by the apparatus described hereinabove and exposed to ultrasonic energy exhibited increased resistance to bursting in hydrostatic tests as compared to untreated pipe sections as shown in Table I. The plastic pipe is also more resistant to thermal embrittlement which is characterized by a slit-type failure when subjected to elevated temperature hydrostatic tests.

The data shown in Table I was obtained in the manner described in ASTM Test D1598–58T. This method of test relates to a procedure for determining the time-

What is claimed is:
1. Apparatus for fabricating spherulite-forming thermoplastic conduits comprising an extruder, a conduit forming means mounted thereon, a cooling bath spaced a distance from said forming means and adapted to receive the extrudate from said conduit forming means, an ultrasonic vibration chamber positioned between said forming means and said bath comprising means for receiving and maintaining an energy transmitting liquid in peripheral contact with an annular portion of the extrudate, and a suitably activated transducer associated with the vibration chamber and adapted to impart radial ultrasonic vibrations to the energy transmitting liquid.

2. Apparatus for fabricating spherulite-forming thermoplastic conduits comprising an extruder, a die mounted thereon having an annular orifice, a bath containing liquid for cooling the extruded conduit spaced a distance from said die and having an aperture therein adapted to receive and support the formed conduit, an ultrasonic vibration chamber positioned between said orifice and said bath provided with means for maintaining a toroidal volume of energy transmitting liquid surrounding an annular portion of the extruded conduit, a transducer surrounding said toroidal volume and adapted to impart radial ultrasonic vibrations to the energy transmitting liquid, and means for energizing said transducer attached thereto.

3. Apparatus for fabricating spherulite-forming thermoplastic conduits comprising an extruder, a die mounted thereon having an annular orifice, an ultrasonic vibration chamber in axial alignment with and spaced a distance from said die, said chamber comprised of a hollow spool, a first sizing plate mounted on the front of said spool and having an opening therein through which the thermoplastic conduit is drawn, a second sizing plate mounted on the rear of said spool and having an opening therein through which the thermoplastic conduit is drawn, said second sizing plate having a plurarlity of apertures therethrough situated in the annular portion of the plate between the opening through which the conduit is drawn and the junction of said plate with the spool; a cooling bath immediately adjacent the second sizing plate of the vibration chamber having an opening therein communicating with the opening and plurality of apertures in said second sizing plate to permit entry of the thermoplastic conduit into said cooling bath and transfer of a portion of the energy transmitting liquid from the cooling bath into the vibration chamber, a transducer mounted on the periphery of the vibration chamber adapted to impart radial ultrasonic vibrations to the energy transmitting liquid within said vibration chamber, and an ultrasonic generator capable of providing a frequency above about 20,000 cycles per second to said transducer.

References Cited by the Examiner

UNITED STATES PATENTS

| | | | |
|---|---|---|---|
| 2,423,260 | 7/47 | Slaughter | 18—14 |
| 2,539,398 | 1/51 | Bowes. | |
| 2,616,128 | 11/52 | Barry et al. | 18—14 |
| 2,945,258 | 7/60 | Houston | 18—14 |
| 2,954,271 | 9/60 | Cenzato. | |

MICHAEL V. BRINDISI, *Primary Examiner*.